United States Patent [19]

Evans et al.

[11] 4,183,834
[45] Jan. 15, 1980

[54] IONIZED ROSIN-BASED RESINOUS MIXTURES AS TACKIFIERS FOR LATEX

[75] Inventors: James M. Evans, Lynn Haven; Walter W. Spangler, Jr., Panama City, both of Fla.

[73] Assignee: Sylvachem Corporation, Jacksonville, Fla.

[21] Appl. No.: 968,208

[22] Filed: Dec. 11, 1978

[51] Int. Cl.$^2$ .................. C08L 93/04; C08L 9/10
[52] U.S. Cl. .................. 260/27 BB; 260/24; 260/26; 260/27 R; 260/27 EV; 260/29.2 UA; 521/150; 428/497; 428/500; 427/13
[58] Field of Search ............ 260/24, 26, 27 R, 27 EV, 260/27 BB

[56] References Cited

U.S. PATENT DOCUMENTS

| | | | |
|---|---|---|---|
| 3,106,550 | 10/1963 | Bitting et al. | 260/26 |
| 3,174,942 | 3/1965 | Erikson et al. | 260/27 BB |
| 3,438,918 | 4/1969 | Arlt et al. | 260/26 |
| 3,824,203 | 7/1974 | Tabibian | 260/27 BB |

FOREIGN PATENT DOCUMENTS 1097409  7/1955  France .................. 260/27 R

*Primary Examiner*—H. S. Cockeram
*Attorney, Agent, or Firm*—Merton H. Douthitt

[57] ABSTRACT

A resinous polyelectrolyte, especially suitable for use as a tackifier in latex adhesives, comprises an ionizable resinous mixture which is ionized with a volatile ionizing agent, said ionizable resinous mixture being the reaction product of a rosin, a carboxylic acid, and a $C_1$-$C_{18}$ mono-alcohol, said ionizable resinous mixture having a softening point not substantially above about 125° C. and an acid number of between about 30 and 150, said reaction product comprising the carbocyclic nucleus of rosin having at least one carboxylic acid group and at least one carboxylic acid ester group of said mono-alcohol.

22 Claims, No Drawings

IONIZED ROSIN-BASED RESINOUS MIXTURES AS TACKIFIERS FOR LATEX

BACKGROUND OF THE INVENTION

The present invention relates to a novel resinous mixture and more particularly to a novel ionizable resinous mixture of a modified rosin which is especially useful as a tackifying agent in latex adhesive formulations.

Present latex adhesives typically contain tackifiers (e.g. rosins, hydro-carbons, etc.) which are emulsified in the adhesive formulation with the aid of a surfactant (e.g. potassium oleate or the like) and a stabilizing additive (e.g. casein or the like). However, such surfactants and stabilizers contribute to poor adhesive properties and to increased water sensitivity of the latex adhesive formulation. For further information on adhesives, see Skeist, Handbook of Adhesives, Second Edition, Van Nostrand Reinhold Company, New York, N.Y. (1974), the disclosure of which is expressly incorporated herein by reference.

The instant ionizable resinous mixture can be stably dispersed in the latex adhesive formulation and is quite compatible with the latex, is converted to a hydrophobic resinous material upon volatilization of the volatile ionizing agent therefrom, provides excellent adhesion, tack, sheer, and peel to the adhesive formulation, and is substantially insensitive to water.

BROAD STATEMENT OF THE INVENTION

The present invention is a resinous polyelectrolyte dispersed in water comprising water and an ionizable resinous mixture which is ionized with a volatile ionizing agent, said ionizable resinous mixture being the reaction product of a a rosin, a carboxylic acid, and a $C_1$–$C_{18}$ mono-alcohol, said ionizable resinous mixture having a softening point not substantially above about 125° C. and an acid number of between about 30 and 150, d reaction product comprising the carbocyclic nucleus of rosin having at least one carboxylic acid group and at least one carboxylic acid ester group of said mono-alcohol.

DETAILED DESCRIPTION OF THE INVENTION

The ionizable resinous mixture can be anionic or cationic for especially good compatibility with the latex in the latex adhesive formulation, be the latex anionic, cationic, or non-ionic. The essential ingredients for the novel ionizable mixture are rosin, an unsaturated carboxylic acid (hereinafter grafting acid), and a mono-alcohol.

The rosin can be used in its essentially monomeric form as derived from conventional rosin processing operations, subjected to polymerization to produce a rosin polymer, and mixtures thereof. The rosin even may be decarboxylated, though this form of rosin has obvious disadvantages. Preferably, tall oil rosin is used for formulating the instant ionizable resinous mixture. Tall oil rosin resulting from tall oil processing operations consists mainly of resin acids—fused triple-ring polycyclic tertiary monocarboxylic acids—typified by abietic acid. Other resin acids found in tall oil rosin include levopimaric acid, neo-abietic acid, dehydroabietic acid, dihydroabietic acid, tetrahydroabietic acid, pimaric acid, isopimaric acid, and palustric acid with very minor amounts of other related acids also being present. For present purposes tall oil rosin can include any of the various resin acids typical of tall oil rosin though preferably a mixture of such resin acids as is normally found in tall oil rosin resulting from tall oil processing operations is used to form the novel resinous mixture of the present invention. Other rosins useful in the present invention include gum rosin and derivatives thereof, wood rosin and derivatives thereof, or even mixtures of rosins if desired.

Rosin polymer is composed mainly of dimer resin acid with lesser quantities of higher polymeric resin acids also being present. Rosin polymer can be made by subjecting rosin (tall oil, wood, gum or mixtures thereof) to a (cationic) polymerization process in the presence of suitable acid catalysts such as, for example, zinc chloride, tin chloride, boron trifluoride and various boron trifluoride complexes, sulfuric acid, and the like conventional rosin polymerization catalysts. Generally, about 0.1% to 0.2% catalyst by weight of the rosin is used in conventional rosin polymerization processes. Temperatures for the polymerization process normally range from about 100° C. to about 200° C. Bleaching of the rosin can be practiced as is necessary, desirable, or convenient in conventional fashion.

An unsaturated carboxylic acid compound is grafted or reacted onto the rosin. Preferably, the carboxylic acid is $\alpha$-,$\beta$-ethylenically unsaturated for grafting onto the rosin by reaction with the unsaturation contained in the resin acid found in the rosin. Additionally, one may conduct a conventional Diels-Alder reaction for grafting an unsaturated carboxylic acid onto the rosin. The precise nature of the graft of the ionizable compound onto the rosin need not be precisely characterized as it is necessary only that the grafting acid be chemically united with the rosin for purposes of the present invention. Representative acids include, for example, fumaric acid and its half ester, maleic acid (including maleic anhydride) and its half ester, acrylic acid, methyacrylic acid and related alkyl and aryl acrylic acids, itaconic acid (and anhydride), and oligomers and copolymers of acrylics and vinyls with ethylenically unsaturated acids (e.g. styrene/acrylic acid copolymers, etc.).

Alcohols for forming a carboxylic ester attached to the rosin are monoalcohols of $C_1$–$C_{18}$ chain length and preferably a $C_6$–$C_{10}$ chain length, including hydroxyl-bearing equivalents such as a mono-epoxide or the like. Representative mono-alcohols include, for example, butanol, hexanol, octanol, decanol, optionally with $C_1$–$C_4$ substitution, e.g. 2-ethyl hexanol, and the like and mixtures thereof. A presently preferred alcohol for such ester group formation is decanol.

In forming the carboxylic acid ester-modified rosin, the acid may be grafted onto the rosin followed by the addition of the mono-ol to form ester groups; the preformed ester of the grafting acid and mono-ol grafted onto the rosin; the rosin grafting-acid, and mono-ol reacted together to in situ form the acid graft and the ester; or the mono-ol can be added to the rosin followed by the addition of the grafting acid. It should be noted that the ester may be formed from the acid grafted onto the rosin; from the carboxyl group of the rosin, or combinations thereof. Of course one skilled in the art will appreciate that there are numerous modifications to the foregoing reaction procedures which are included within the spirit of this invention.

Broadly, the novel resinous mixture can be made from 40–85% rosin, 5–20% grafting acid, 10–30% mono-alcohol, and optionally 0–10% polyol. Preferred proportions presently are about 65% rosin, 10% grafting acid, 20% mono-alcohol, and 5% polyol (e.g. a glycol). Typically, about 1–2 equivalents of acid functionality (rosin and grafting acid) per 0.5–1.5% equivalents of hydroxyl functionality is used in making the novel resinous mixture. The precise proportions of a grafting acid and mono-ol used to modify the rosin are adjusted so that the ionizable resinous mixture has a softening point of less than about 125° C., advantageously about −25° to 125° C. and preferably about 0°–50° C.; and acid number (A.N.) of between about 30 and 150 and preferably between about 50 and 80. The particular type of rosin, grafting acid, and mono-ol will determine their individual proportions for producing the product as defined herein. Also, the novel ionizable resinous mixture can be admixed with various other modified rosins, such as, for example, rosin grafted with various acrylic or vinyl monomers, oligomers, or copolymers; rosin grafted with a carboxylic acid ester of other mono-ols, polyols, polyepoxides, or the like; hydrocarbon resins; rosin; rosin esters; phenolic modified rosin derivatives; hydrogenated rosin derivatives; disproportionated rosin derivatives; poly-terpene resins; and the like and mixtures thereof.

The volatile ionizing agent for forming resinous polyelectrolytes preferably is an amino ionizing agent conventionally used for such purpose such as, for example, ammonia, dimethyl ethanol amine, methyl amine, ethanol amine, diethanol amine, triethanol amine, triethyl amine, and the like. The ionizing agent is volatile for present purposes when it can be removed from the rosin or rosin polyelectrolyte under conditions effective for volatilizing water from a latex adhesive formulation. Such conditions include room temperature evaporation and/or heating. Upon volatilization of the volatile ionizing agent from the resinous polyelectrolyte, the grafted rosin is reconverted into a water insoluble (hydrophobic) form and when used in a latex adhesive formulation provides superior tackifying properties to such formulation. Of course, minor amounts of polyvalent metals (e.g. calcium, zinc, magnesium, and the like) may be added to the resinous mixture to form polyelectrolyte salts, without departing from the spirit of this invention. Polyelectrolyte is meant to include (mono) electrolyte as the novel product is a mixture which may contain mono and poly-carboxylic acid bearing components and ionization of such acid groups with a volatile base renders such mixture a (poly) electrolyte resinous mixture.

For cationic polyelectrolytes, sufficient ionizable compound is reacted onto ionizable resinous mixture to render the resulting product effectively nonacidic so that when ionized with a volatile cationic-providing ionizing agent, the resulting resinous polyelectrolyte possesses an overall cationic functionality. Appropriate functionality which such ionizable compound should possess in order to form cationic groups include primary, secondary, and tertiary (poly) amines and imines, alkanol amines for forming quaternary ammonium hydroxide groups, mercaptan or thiol compounds for forming sulfonium groups, and mixtures thereof. Such amine groups may be ionized with a protic acid to render such groups cationic. Typical protic acids include, for example, formic acid, lactic acid, acetic acid, phosphoric acid including organic phosphoric acids, and the like and mixtures thereof. Also one may use carbonic acid provided that appropriate superatmospheric pressure is maintained. Desirably, the proportion of protic acid used to ionize the cationizable compound is insufficient for rendering the resulting cationic resinous polyelectrolyte strongly acidic, as strongly acidic cationic resinous polyelectrolyte when used in a latex adhesive formulation may contribute to undesirable side effects of the adhesive in use (such as if the adhesive is to be used for bonding an object with metal). Reference is made to the electrocoating art in general for proposing a variety of ionizable compounds and volatile ionizing agents some of which may be suitably adapted for use in the present invention. A volatile ionizing agent for forming a cationic resinous polyelectrolyte is as defined above.

The proportion of ionizing agent added to the ionizable resinous mixture is sufficient for stably dispersing the resinous mixture in water and often an excess of this proportion is used. Factors which influence the proportion of ionizing agent used include, for example, acid number of the mixture, weight ratio of mixture to water, softening point of the mixture, and like known factors. Resinous mixtures of relatively lower acid number (e.g. A.N. of 30–50) may require substantially full neutralization (ionization) in order to effectively disperse the mixture in water. Resinous mixtures of relatively higher acid number (e.g. A.N. of 115–150) may require only partial ionization. Resinous mixtures of relatively low softening point (typically liquified) will tend to be more easily dispersed with lesser proportions of ionizing agent than resinous mixtures of relatively higher softening point. Those skilled in the art will appreciate the various methods and factors which must be considered in order to effectively and stably disperse the resinous mixture in water, and for forming an aqueous latex adhesive composition containing the resinous polyelectrolyte as a tackifier therein.

The novel resinous mixture, both in ionizable and ionized form, produced according to the instant invention ranges from liquid under ambient conditions, though often it is quite viscous, on up to a brittle solid depending upon the softening point of the resinous mixture. The inherent viscosity of the resinous polyelectrolyte can be controlled in part by varying the degree of ionization of the resinous polyelectrolyte in conventional fashion. The resulting resinous mixture (ionizable or ionized) can be stored and handled in such form relatively easy and in ionized form low softening point resinous mixtures can be dispersed in water for storage and handling with little or no external heating. Polyelectrolyte resinous mixtures with relatively high softening points may require some heating and occasionally cosolvent addition for dispersing in water. Additionally, low softening point resinous polyelectrolytes may be used to assist in dispersing relatively high softening point resinous mixtures (or polyelectrolytes) in water. Such resinous mixture and resinous polyelectrolyte possess excellent long-term stability which is a decided benefit. The resinous polyelectrolyte, optionally predispersed in water, can be admixed directly into a conventional latex adhesive formulation typically in proportion of about 15% to 300% by weight of the latex solids of such formulation, though it must be recognized that the proportion of resinous polyelectrolyte tackifier may vary greatly from these figures depending upon the particular latex, intended application, application technique and the like. A latex adhesive formulation containing the novel resinous mixture ionized with a volatile ionizing agent can be foamed with the use of a foaming or blowing agent to provide a novel and useful foamed latex adhesive.

The novel resinous polyelectrolyte as a tackifier in latex adhesive formulations should be converted (or reconverted) into a hydrophobic resinous mixture upon volatilization of water from the adhesive formulation. Volatilization of the ionizing agent from the resinous (poly) electrolyte accomplishes this conversion. For advantageous volatilization of the ionizing agent and for providing a substantially water-insensitive resinous mixture in the dried latex adhesive formulation, the grafting acid used to modify the rosin desirably should have a pK of between about 3 and 8, preferably between about 4 and 6, and the volatile ionizing agent desirably should have a pKa of between about 3 and 12, preferably between about 8 and 11.

A variety of latex adhesives are known in the art. Such latex adhesive formulations can be derived from natural or synthetic rubbers or elastomers, such as styrene-butadiene copolymers (SBR), natural rubbers, cyclized rubbers, acrylonitrilebutadiene copolymers (NBR), chlorinated rubbers, polychloroprene (neoprene), rubber hydrochloride, polysulfide rubber, carboxylic elastomers, silicone rubbers, polyurethane rubbers (isocyanate), acrylonitrile-butadiene-styrene copolymers (ABS), butyl rubber, polyisoprene, epichlorohydrin, homopolymer rubbers, epichlorohydrinethylene oxide rubbers, propylene oxide-allyl glycidyl ether copolymer rubbers, ethylene-propylene copolymer rubbers, ethylene-propylene-diene monomer terpolymer rubbers, and the like. Alternatively, such latex adhesive formulations can be derived from the various acrylic or vinyl latices such as, for example, ethylene ethylacrylate copolymers, ethylene vinylacetates, and the like.

When the novel resinous polyelectrolyte is dispersed in a latex adhesive formulation and the water thereof volatilized along with the volatile ionizing agent, such novel resinous latex adhesive is ideally suited for a variety of uses. Typical uses of such adhesive formulation include pressure sensitive adhesives for application to tapes, labels, etc.; contact adhesives; laminating adhesives, and the like.

Such novel latex adhesive formulation containing the resinous polyelectrolyte is extremely stable even for extended periods of time and the resinous polyelectrolyte therein provides exceptional tack, peel, and sheer strength of the latex adhesive formulation, and is substantially insensitive or is resistant to water. The resinous polyelectrolyte dispersed in water also possesses exceptional hydrolytic stability which is a decided benefit for the product, especially when used as a tackifier in latex adhesive compositions. Such good performance of latex adhesives containing the novel polyelectrolyte resinous mixture is due at least in part to the substantial absence of conventional rosin emulsifying agents which adversely affect the performance of the adhesives into which they are incorporated. Additionally, electrostatic spraying techniques for application of a latex adhesive containing the present resinous polyelectrolyte tackifiers can be advantageous. The following examples will demonstrate such superior properties of the novel resinous polyelectrolytes of the instant invention.

The following examples show in detail how the present invention can be practiced but should not be construed as limiting. In this application, all percentages and parts are by weight and all units are in the Metric System, unless otherwise expressly indicated.

INTRODUCTION TO THE EXAMPLES

The following materials and test procedures were used in the Examples.

1. SYLVAROS 20 Tall Oil Rosin (SYLVAROS is a registered trademark of Sylvachem Corporation, Jacksonville, Fla.)—The product data sheet for this rosin reports an Acid Number of 174 (ASTM D465) and a softening point of 70° C. (ASTM E28, ring-and-ball method).

2. SYLVATAC 70 Tall Oil Rosin (SYLVATAC is a registered trademark of Sylvachem Corporation)—The product data sheet reports this rosin to have an Acid Number of 164 and a softening point of 67° C.

3. FR-S Synthetic Latex (FR-S is a registered trademark of Firestone Tire and Rubber Company, Akron, Ohio)—The product data sheet reports this elastomer to be a carboxylated Butadiene/Styrene copolymer made in a hot melt polymerization system and having the following typical properties.

| Total Solids | 50% |
| --- | --- |
| pH | 9.3 |
| Residual Styrene | 0.05% |
| Mooney, $ML_4$ at 212° F. | 110 |
| Surface Tension (Dynes/cm) | 55.0 |
| Bound Styrene | 48.0% |
| Coagulum (80 mesh) | 0.04% |

4. AMSCO RES 4125, 4151, and 4170 (Amsco Division Union Oil Company of California, Los Angeles, Calif.)—The product data sheets for these elastomers report them to be carboxylated styrene-butadiene copolymers with the following typical properties.

|  | 4125 | 4151 | 4170 |
| --- | --- | --- | --- |
| Monomer Ratio (%, S/B) | 45/55 | 45/55 | 65/35 |
| Solids (wt-%) | 50.0 | 50.0 | 5.0 |
| pH | 9.2 | 9.2 | 9.2 |
| lbs/gal (25 α C.) | 8.3 | 8.3 | 8.3 |
| Viscosity (cps) | 300 | 300 | 300 |
| Tg (°C.) | −32 | −30 | −7 |

5. duPont Elastomers 842A, 572, 750, and 400 (E. I. duPont de Nemours and Company, Wilmington, Del.)—The data sheets report these neoprene latex elastomers to have the following typical properties.

|  | 842A | 572 | 750 | 400 |
| --- | --- | --- | --- | --- |
| Primary Monomer | Chloroprene | Chloroprene | Chloroprene | Chloroprene |
| Co-Monomer | — | Sulfur | 2,3-dichloro-1,2-butadiene | 2,3-di-chloro-1,3-butadiene |
| Chlorine Content (%) | 37.5 | 38 | 40 | 48 |
| pH (25° C.) | 12.0 | 12.0 | 12.5 | 12.5 |
| Solids (%) | 50 | 50 | 50 | 50 |
| Viscosity (Brookfield at 25° C., cps) | 15 | 10 | 10 | 9 |

6. Rolling Ball Tack Test: PSTC-6 (November 1970), Pressure Sensitive Tape Council, Glenview, Ill. Results of this test are reported in inches.

7. 180° Peel Test: PSTC-1 (November 1975), Pressure Sensitive Tape Council. Results of this test are reported in ounces/inch.

8. 178° Shear Test: PSTC-7 (November 1975), Pressure Sensitive Tape Council. Results of this test are reported in hours/500 gm/0.5 in.$^2$.

9. Polyken Tack Test: This test is conducted on a POLYKEN, JR. Probe Tack Tester (POLYKEN is a trademark of the Kendall Company) supplied by Testing Machines Inc. (Amityville, N.Y.) under the following conditions:

| | |
|---|---|
| Probe: | 304 SS, 0.5 cm. diameter probe polished to a 4/0 emery paper finish |
| Dwell Time: | 1 second |
| Probe Contact Pressure: | 100 gm/cm$^2$ |
| Probe Retraction Rate: | 1 cm/sec. |
| Annular Weight: | 20 gm. = 100 gm/cm$^2$ pressure of a 0.5 cm. diameter probe |
| Procedure: | A one-inch square of MYLAR polyester film coated with the adhesive is placed on top of the annular weight so that the hole is completely covered by the adhesive area and this assembly placed in the weight carrier well. The machine is activated and the sequence of probe pressure and probe retraction automatically accomplished. The force required to free the probe from the adhesive-coated film, measured in grams/cm$^2$, is read from the indicator dial on the machine. |

EXAMPLE I

SYLVAROS 20 tall oil rosin (315 g) was heated at 180° C. in a reaction vessel fitted with a stirrer and designed to allow monitoring of water production from the reaction. Fumaric acid (39 g) was added to the vessel and the reaction temperature increased to 260° C. for two hours. Thereafter, decyl alcohol (158 gr., 1 molar equivalent) was added to the vessel at a metered rate which prevented the reaction temperature from dropping by more than 20° C. The reaction temperature then was slowly raised to 264° C. and the progress of the esterification monitored by measuring the quantity of by-product water produced. The esterification reaction was run for 5 hours until the desired acid number range (90–100) was achieved after which the product was steam sparged for one hour at 260° C. to remove unreacted volatile material.

The novel ionizable rosin product was determined to have an acid number of 92.1 and a softening point of 21.5° C. A substantially identical product was also made by adding the fumaric acid and decyl alcohol to the molten rosin at 180° C. and by adding decyl fumarate to the molten rosin at 180° C., each reaction then proceeding as above outlined.

EXAMPLE II

The procedure of Example I was repeated with fumaric acid (39 gm), SYLVATAC 70 tall oil rosin (334 gm), and 2-ethylhexanol (130 gm), except that the esterification reaction was run for 11.5 hours until the desired acid number range (70–80) was achieved, and the steam sparging was run for 0.5 hours.

The ionizable rosin product was found to have an acid number of 76.5 and a softening point of <5° C. As in Example I, a similar rosin product was made by the simultaneous addition of 2-ethylhexanol and fumaric acid to the molten tall oil rosin and by the addition of 2-ethylhexyl fumarate to the molten tall oil rosin.

EXAMPLE III

The procedure of Example I was repeated with fumaric acid (39 gm, or 0.33 molar equivalanets), SYLVATAC 70 tall oil rosin (334 gm or 1 molar equivalent), and benzyl alcohol (108 gm or 1 molar equivalent). The desired acid number range (80–90) was reached during the esterification reaction after 15 hours and the product steam sparged for 0.5 hours.

The ionizable rosin product had an acid number of 84.5 and a softening point of 35.5° C. Subtantially identical products also were made by the alternative procedures described in the previous examples.

EXAMPLE IV

An aqueous adhesive system was formulated from an ionizable resinous mixture formulated from SYLVATAC 70 rosin, fumaric acid, and decyl alcohol in the reaction scheme described in Example I; and a carboxylated styrene-butadiene latex (SBR latex, Firestone FRS 257) as the elastomer. The ionizable resinous mixture had an acid number of 65.5 The adhesive formulation was as follows:

| | |
|---|---|
| 30 gms | Decyl ester of fumaric acid modified rosin |
| 57.92 gms | FRS 257 (51.8% solids by weight) |
| 28.96 gms | Water |
| 3.12 gms | Dimethyl aminoethanol |

The resinous mixture and dimethyl aminoethanol (volatile ionizing agent) were stirred in a vessel until well mixed. The water was added to the vessel under stirring to produce a white, creamy liquid. The FRS 257 latex then was mixed into the vessel for 15 minutes to yield an aqueous adhesive system exhibiting the following properties.

| | |
|---|---|
| Viscosity (centipoises, Brookfield) | 800-900 |
| pH | 9.0 |
| Total Solids (weight) | 50% |
| Weight ratio Resinous Mixtures: FRS 257 | 1:1 |

EXAMPLE V

The procedure of Example IV was repeated used AMSCO 4125 SBR latex as the elastomer.

EXAMPLE VI

The aqueous adhesive systems of Examples IV and V were formulated at weight ratios of resinous mixture to SBR latex of 0.5:1, 0.75:1, 1.25:1, and 1.5:1 and with the adhesives of Example IV and V were evaluated for their adhesive properties.

A portion of each adhesive formulation was poured onto a 1.5 mil thick mylar polyester film and drawn down under a Boston Bradley adjustable applicator at a thickness of 6 mils. The coated film was cured in a forced draft oven at 95° C. for 15 minutes and stored overnight in a controlled atmosphere (71°–75° F. at 45–51% relative humidity). The results of the adhesive properties evaluation are displayed below.

TABLE I

|  | FRS 257 LATEX | | | | AMSCO 4125 LATEX | | | |
| --- | --- | --- | --- | --- | --- | --- | --- | --- |
| Resinous Mixture:SBR | 0.75:1 | 1:1 | 1.25:1 | 1.5:1 | 0.5:1 | 0.75:1 | 1:1 | 1.25:1 |
| Rolling Ball Tack | 9.0 | 3.0 | 1.75 | 1.6 | 1.5 | 0.5 | 0.5 | 0.4 |
| 180° Peel | 32 | 28 | 26 | 20 | 40 | 44 | 51 | 51 |
| 178° Shear | >100 | >100 | 91 | 0.2 | 2.0 | 1.15 | 0.23 | 0.20 |
| Polyken Tack | 406 | 372 | 500 | 330 | 440 | 572 | 531 | 506 |

The foregoing tabulated results demonstrate the excellent performance properties which aqueous adhesives containing the novel ionizable resinous mixtures display.

EXAMPLE VII

An aqueous adhesive system was formulated in the manner of Example IV from a resinous mixture like that of Example II but having an acid number of 78.8 (45.5 grams), dimethyl amino-ethanol (5.63 gm), water (41.45 gms), and FRS 257 latex (57.92 gms). The adhesive system had a total solids of 50% by weight and a weight ratio of 2-ethylhexyl ester of fumaric acid modified rosin:FRS 257 of 1.5:1.

EXAMPLE VIII

An aqueous adhesive system was formulated in the manner of Example IV from a resinous mixture of Example III having an acid number of 84.0 (45 gms), dimethyl aminoalcohol (6.01 gm), water (41.17 gms), and FRS 257 latex (57.92 gms). The weight ratio of benzyl ester of fumaric acid modified rosin:FRS 257 was 1.5:1 at 50% total solids for the system.

EXAMPLE IX

The adhesive systems of Examples VII and VIII were evaluated in the same manner as described in Example VI and the following performance evaluation results were found.

TABLE II

|  | Adhesive of Example VII | Adhesive of Example VIII |
| --- | --- | --- |
| Rolling Ball Tack (inches) | 7.5 | 10 |
| 180° Peel (oz/inch) | 40 | 57 |
| 178° Shear (hrs/500 gms/0.5 in$^2$) | 7.4 | 23 |
| Polyken Tack (gm/cm$^2$) | 485 | 275 |

EXAMPLE 10

The ionizable resinous mixture of Example IV was formulated into adhesive systems with several latex systems at a 1:1 weight ratio of resinous mixture:latex. The adhesive systems were formulated by the procedure described in Example IV and prepared for evaluation by the procedure described in Example VI. The following results were found.

TABLE III

| LATEX TYPE | Amsco 4151 SBR | Amsco 4170 SBR | du Pont 842A Neoprene | du Pont 572 Neoprene | du Pont 750 Neoprene | du Pont 400 Neoprene |
| --- | --- | --- | --- | --- | --- | --- |
| Rolling Ball Tack (inch) | 1.25 | >10 | 0.8 | 0.5 | 3.0 | 6.0 |
| 180° Peel (oz/inch) | 36 | 36 | 25 | 29 | 40 | 50 |
| 178° Shear (hrs/500 gm/0.5 in$^2$) | >100 | 8.6 | >100 | >100 | 11.6 | 6.0 |
| Polyken Tack (gm/cm$^2$) | 330 | 730 | 400 | 400 | 440 | 520 |

We claim:

1. A resinous polyelectrolyte dispersed in water comprising water and an ionizable resinous mixture which is ionized with a volatile ionizing agent, said ionizable resinous mixture being the reaction product of a rosin, a carboxylic acid, and a $C_1$–$C_{18}$ mono-alcohol, said ionizable resinous mixture having a softening point not substantially above about 125° C. and an acid number of between about 30 and 150, said reaction product comprising the carbocylic nucleus of rosin having at least one carboxylic acid group and at least one carboxylic acid ester group of said monoalcohol.

2. The resinous polyelectrolyte of claim 1 wherein said rosin is selected from tall oil rosin, wood rosin, gum rosin, and mixtures thereof.

3. The resinous polyelectrolyte of claim 1 wherein said carboxylic acid is an $\alpha,\beta$-ethylenically unsaturated acid grafted onto said carboxylic nucleus of rosin.

4. The resinous polyelectrolyte of claim 3 wherein said unsaturated acid is dibasic.

5. The resinous polyelectrolyte of claim 4 wherein said dibasic acid is maleic acid, maleic anhydride or fumaric acid.

6. The resinous polyelectrolyte of claim 1 wherein said ionizing agent is an amino-ionizing agent.

7. The resinous polyelectrolyte of claim 1 wherein said ionizable resinous mixture is further reacted with a cationizable compound, said ionizing agent is a cationic-forming ionizing agent.

8. The resinous polyelectrolyte of claim 1 wherein said mono-alcohol is a $C_6$–$C_{10}$ mono-alcohol.

9. The resinous polyelectrolyte of claim 1 wherein said rosin is a polymerized rosin.

10. The resinous polyelectrolyte of claim 1 wherein said softening point is between about −25° C. and 125° C.

11. The resinous mixture of claim 10 wherein said softening point is between about 0° and 50° C.

12. The resinous polyelectrolyte of claim 1 wherein said ionizable resinous mixture is the reaction product of about 40-85% rosin, 5-20% carboxylic acid, 10-30% mono-alcohol, and optionally 0-10% polyol.

13. The resinous polyelectrolyte of claim 12 wherein said ionizable resinous mixture is the reaction product of about 65% rosin, 10% unsaturated dibasic acid, 20% mono-alcohol, and 5% glycol.

14. The resinous polyelectrolyte of claim 1 which is substantially devoid of surfactants for said rosin.

15. The resinous polyelectrolyte of claim 1 also containing dispersed in said water an adhesive latex wherein the weight ratio of said resinous polyelectrolyte to said latex is between about 0.15:1 to 3:1.

16. The resinous polyelectrolyte of claim 15 having a total solids content of between about 10% and 80%.

17. The resinous polyelectrolyte of claim 15 wherein said latex is thermoplastic or thermosetting.

18. The resinous polyelectrolyte of claim 1 wherein said carboxylic acid has a pK of between about 3 and 8, and said ionizing agent has a pKa of between about 3 and 12.

19. An improved aqueous latex adhesive composition of a latex elastomer and tackifier dispersed in water, the improvement comprising said tackifier being a resinous polyelectrolyte of an ionizable resinous mixture which is ionized with a volatile ionizing agent, said ionizable resinous mixture being the reaction product of a rosin, a carboxylic acid, and a $C_1$-$C_{18}$ mono-alcohol, said ionizable resinous mixture having a softening point not substantially above about 125° C. and an acid number of between about 30 and 150, said reaction product comprising the carbocylic nucleus of rosin having at least one carboxylic acid group and at least one carboxylic acid ester group of said mono-alcohol.

20. The adhesive composition of claim 19 wherein said carboxylic acid has a pK of between about 3 and 8, and said ionizing agent has a pKa of between about 3 and 12.

21. The adhesive composition of claim 20 wherein said pK is between about 4 and 6, and said pKa is between about 8 and 16.

22. A dried adhesive film of the latex adhesive composition of claim 19.

* * * * *

UNITED STATES PATENT AND TRADEMARK OFFICE
CERTIFICATE OF CORRECTION

PATENT NO. : 4,183,834
DATED : Jan. 15, 1980
INVENTOR(S) : James M. Evans and Walter W. Spangler, Jr.

It is certified that error appears in the above-identified patent and that said Letters Patent are hereby corrected as shown below:

Column 1, line 40, "d reaction" should read --said reaction--.

Column 6, line 47, in the table under the heading 4170, "5.0" should read --50.0--.

Signed and Sealed this

Nineteenth Day of August 1980

[SEAL]

Attest:

SIDNEY A. DIAMOND

Attesting Officer          Commissioner of Patents and Trademarks